Oct. 27, 1964  M. F. SYMES  3,154,324
TRAILER WITH ADJUSTABLE SPRING SUSPENSION ASSEMBLY
Filed Sept. 25, 1959  3 Sheets-Sheet 3
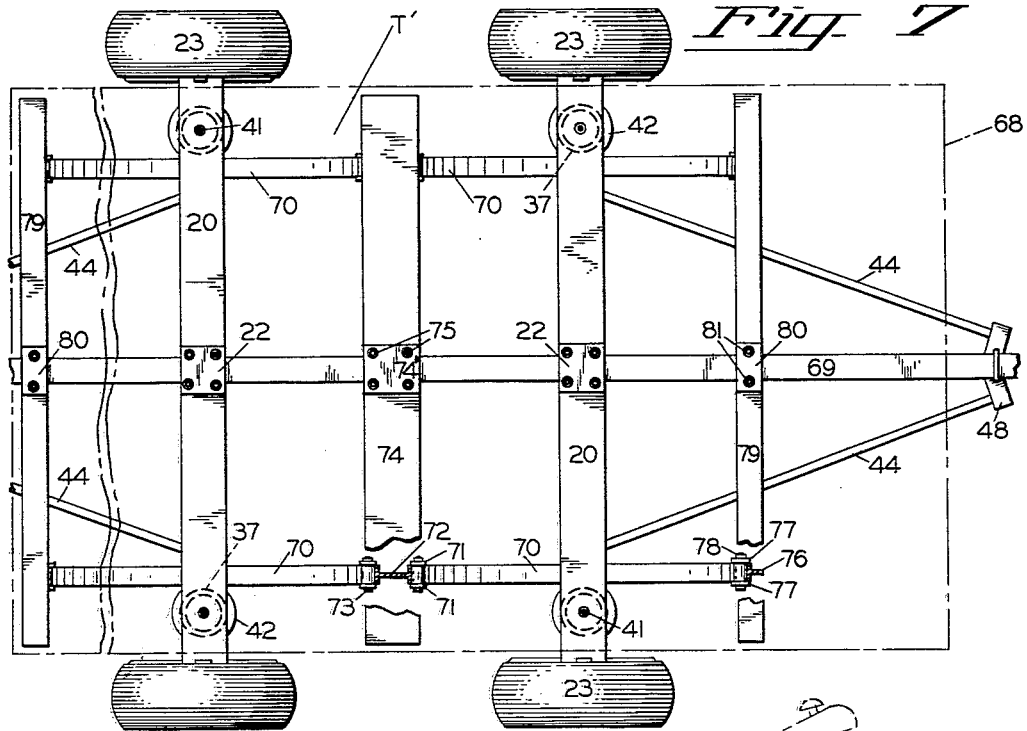
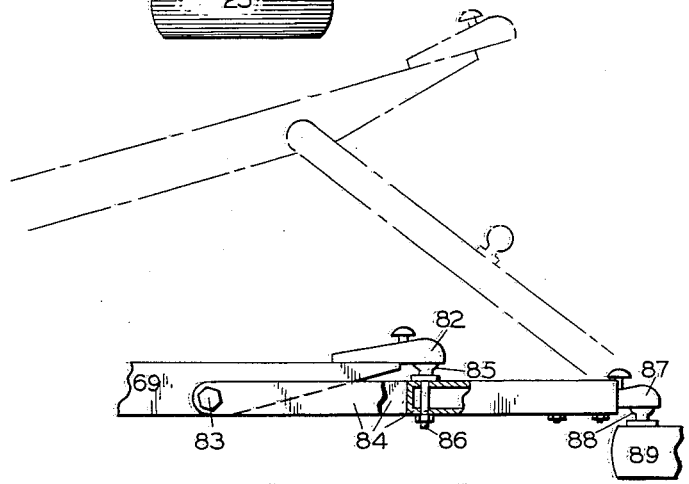
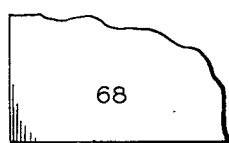
INVENTOR.
MARVIN F. SYMES
BY 
ATTORNEY

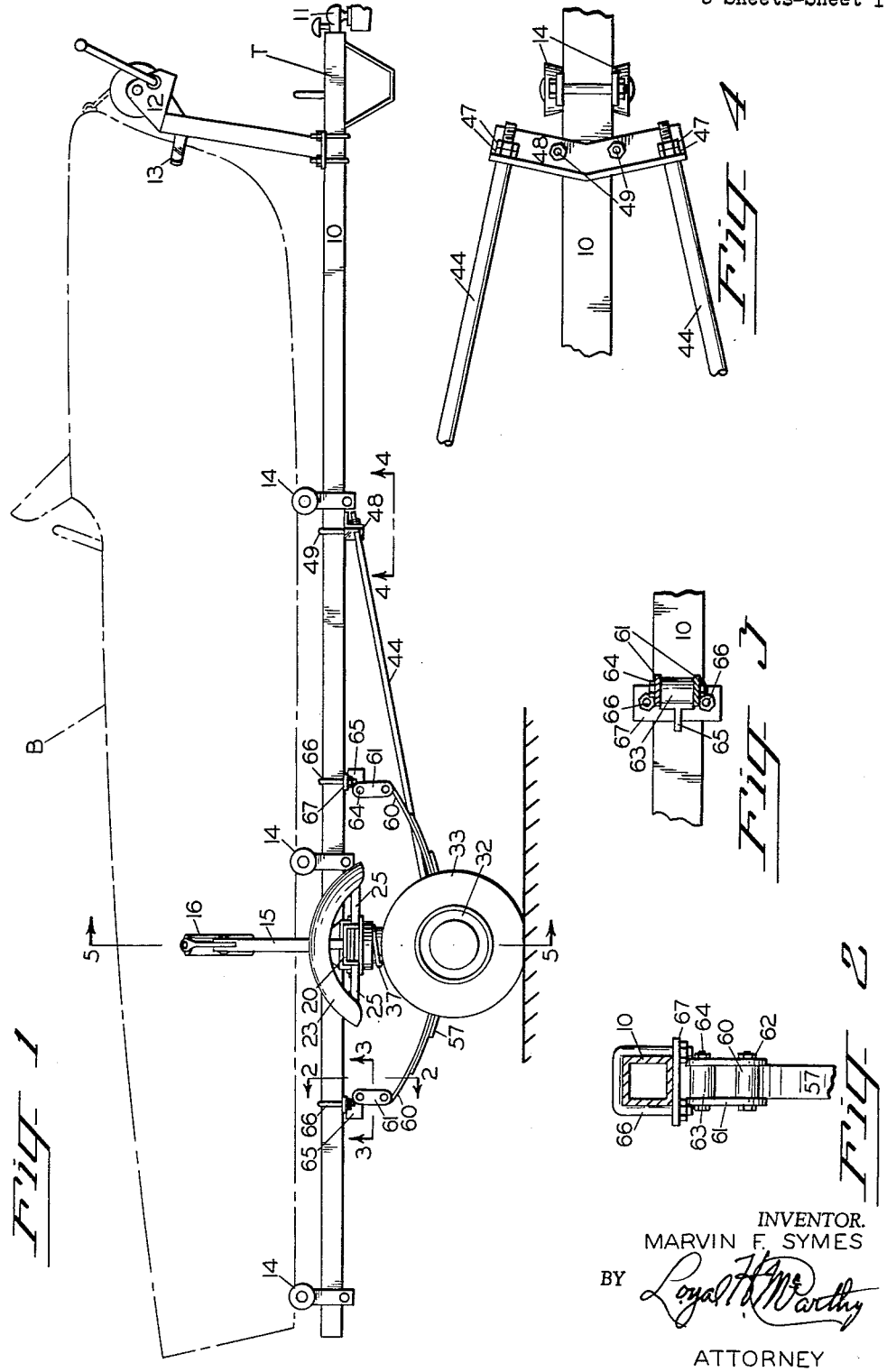

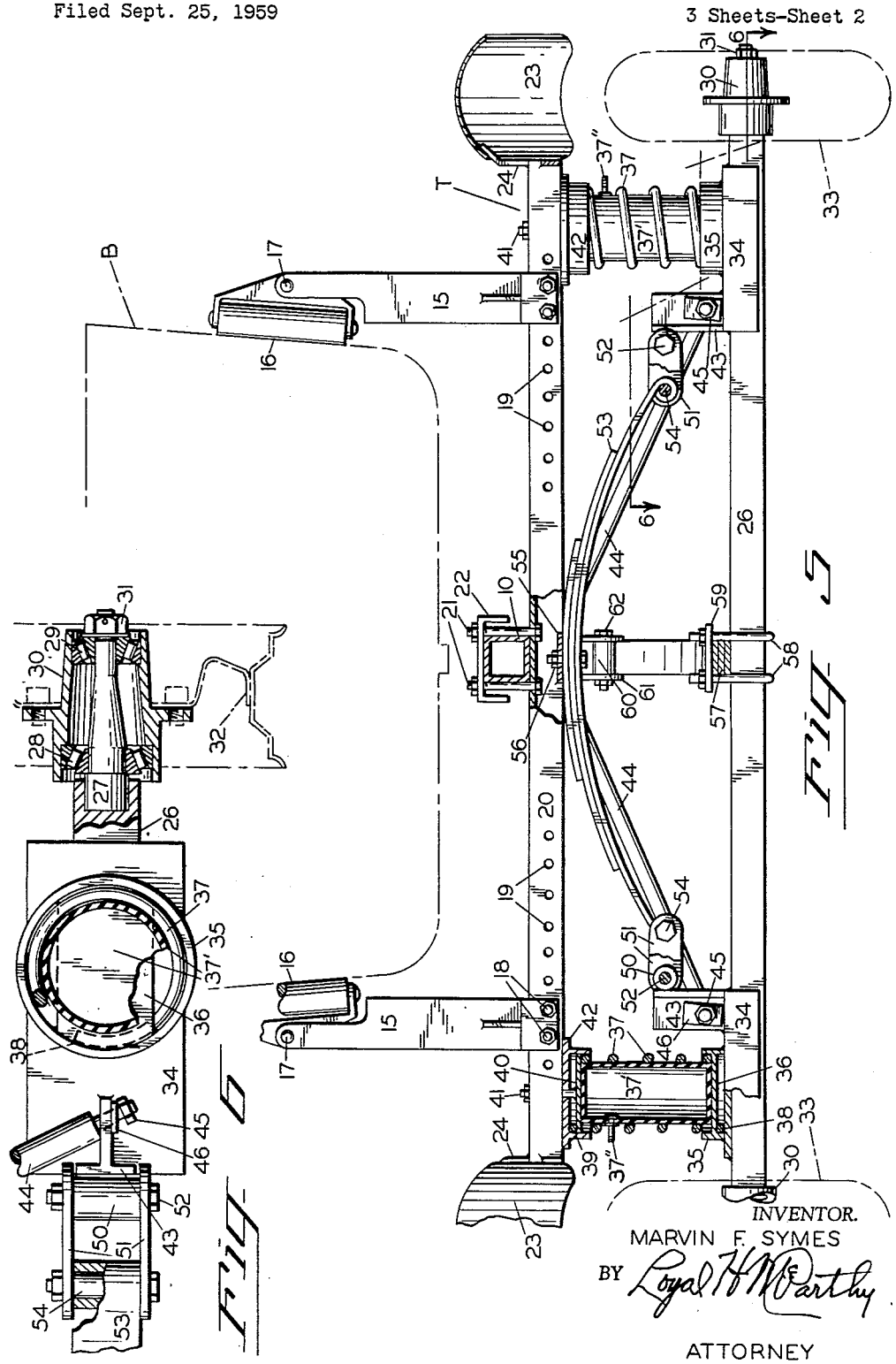

United States Patent Office 3,154,324
Patented Oct. 27, 1964

3,154,324
TRAILER WITH ADJUSTABLE SPRING
SUSPENSION ASSEMBLY
Marvin F. Symes, 7881 SW. Capitol Highway,
Portland, Oreg.
Filed Sept. 25, 1959, Ser. No. 842,431
12 Claims. (Cl. 280—414)

While there have been many types of trailers and many combinations of components for the suspension, adjustment and adaptability to specialized usages for trailers, my trailer incorporates features which make it particularly desirable for multi-use purposes and which render it capable of ready adjustment to accurate alignment and to various load factors that may be encountered in connection with the usage to which the trailer may be put. Furthermore, my improved trailer is assembled in such a manner that it may be easily disassembled into units and thus require a minimum of space for shipment or storage purposes.

It is, therefore, one of the objects of my invention to provide a trailer which may be disassembled for storage or shipping purposes.

It is another object of my invention to provide a trailer which may be rigged as a boat trailer, a utility trailer, a camping trailer, etc.

It is a further object of my invention to provide a trailer which has a boom or tongue which may be readily shifted relative to its carriage unit.

It is a still further object of my invention to provide a trailer which incorporates one or more leaf-type springs arranged at right angles to each other or to at least one of said leaf springs.

It is still another and further object of my invention to provide a trailer incorporating two leaf springs arranged at right angles to each other in combination with coil springs which are supplemented by air boots.

It is still another and further object of my invention to provide a trailer which is capable of having its spring suspension readily changed to meet the requirements of any load or usage to which it may be put without expensive or permanent repairs and alterations.

It is another, further and additional object of my invention to provide a trailer which may be adapted to have more than one carriage unit for purposes of the load requirements or usages to which it may be subjected.

Other and further objects of my invention will be apparent from the specification, drawings, and claims hereinafter set forth.

Referring to the drawings:

FIG. 1 is a side elevation of one version of my trailer rigged for boat-carrying.

FIG. 2 is a detailed end view along line 2—2 of FIG. 1 in the direction of the arrows, showing the manner of attachment of the longitudinal leaf spring to the boom.

FIG. 3 is a fragmentary detailed plan view from the lower surface, showing the attachment of the longitudinal leaf spring to the boom along line 3—3 of FIG. 1 in the direction of the arrows.

FIG. 4 is a fragmentary detailed view showing the manner of attaching the tie-rod-retaining element and boat roller element to the boom of the trailer along line 4—4 in FIG. 1 in the direction of the arrows.

FIG. 5 is a detailed end elevation of my trailer with parts thereof broken away, showing the suspension system of a typical running gear unit taken along line 5—5 of FIG. 1 in the direction of the arrows.

FIG. 6 is a detailed top plan view on an enlarged scale, with parts thereof broken away, showing typical mounting of the coil springs, the transverse leaf spring and tie rod on the axle portion of a carriage or running gear unit taken along line 6—6 of FIG. 5 in the direction of the arrows.

FIG. 7 is a top plan view of a modified running gear and suspension arrangement with parts thereof broken away.

FIG. 8 is a detailed elevational view of a modification of the trailer tongue or boom, the dotted lines indicating the tilting arrangement thereof in the open position.

FIG. 9 is a fragmentary detailed end elevation view of a typical manner of mounting a utility or camping trailer box on the upper cross-member of a carriage unit.

Referring further to the drawings:

The boom, or tongue, 10 of my invention may be of any suitable length and is provided with a conventional type trailer hitch of any suitable design positioned at its forward end of one version of my trailer, designated as T, which is rigged for carrying a small boat B. A winch 12, of any suitable design, and a bow stop-block 13 are secured to an upright or standard which is detachably secured to the tongue 10 by means of U-bolts inserted therethrough and encircling said tongue 10. Boat rollers 14 are retained in the desired positions on the tongue 10 by means of an adjustable clamp and bolt arrangement. Any desired number of boat rollers may be installed on the tongue. Boat supports, consisting of an upright 15 and boat roller blocks 16 pivotally mounted thereto by any suitable means, such as a pin, 17, are secured by bolts, or other fastening means, 18 inserted through holes in the bottom portion thereof, said holes being complementary to holes 19 in the sides of the carriage bunker 20, one boat support being provided on each side of the tongue 10. The carriage bunker 20 is detachably secured to the tongue 10 by means of bolts, or U-bolt, 21 being inserted through holes on the top surface of bunker 20 and then passing through or over a flange element 22 positioned on top of said tongue 10. Fenders 23 are secured to the outer ends of bunker element 20 by means of brackets 24 and 25. Axle, or axletree, 26, which is formed preferably from solid square stock, is provided with wheel spindles 27 at each end thereof. By means of inner and outer bearings 28 and 29, respectively, and any conventional securing means, such as a nut, 31, hub 30 is retained upon the spindle ends 27 of axle 26. Any conventional wheel 32, provided with a tire 33, is mounted upon hub 30 by any suitable means, such as lug bolts. Inwardly of each wheel spindle 27 a flange element 34 is rigidly mounted, or fixedly secured, to the top surface of axle 26. Each of said flange elements is provided with a hollow, cylindrical spring socket 35 spaced from a vertical bracket 43. A coil spring locking plate 36 is fixedly secured within each of the cylindrical spring sockets 35 above the bottom thereof in such a manner that the lower end 38 of coil spring 37 may be threaded thereunder so as to lock said coil spring into the socket 35. An air boot 37', having a standard air valve 37", is positioned circumferentially within spring 37. Said air boot extends from the fixed locking plate 36 in the coil spring socket 35 to a removable locking plate 40 which is inserted below the upper end 39 of spring 37 in such a manner that the air boot 37', coil spring 37, and locking plate 40 are retained within the confines of the hollow, cylindrical upper spring socket 42 by means of a bolt 41 fixedly secured in the upper spring locking plate 40 and passed through a complementary hole in the upper spring socket 42 and an aligning, complementary hole in the carriage bunker 20. The ends of tie-rods 44 are provided with threads which are smaller in diameter than said tie-rod 44 and are secured to brackets 43 by one of its threaded ends being inserted through a complementary hole in said bracket. A washer 46 and nut 45, complemenary to said threaded end, are engaged on said ends on the other side of the brackets 43.

Forward bracket 48, preferably made of angle iron stock and bent to be perpendicular to the axis line of each of the tie-rods 44, secures the forward ends of said tie-rods by means of a hole in each end thereof complementary to the threaded forward ends of said tie-rods and jam nuts 47 engage upon the outer ends of the tie-rods. A U-bolt 49 secures the forward bracket 48, medially thereof, to the tongue 10.

Each of the vertical brackets 43, which are positioned on flange elements 34 inwardly of the coil spring sockets 35, has a horizontally positioned bearing housing 50 rigidly secured on the inner surface thereof, said bearing housing 50 having link elements 51 pivotally attached at each end thereof by means of a bolt, or pin, 52 journaled in said housing 50. The opposite ends of the link elements 51 are pivotally attached to an end of a transverse leaf spring 53 by means of a bolt, or pin, 54 journaled therein. The transverse leaf spring 53 is positioned parallel to and between the carriage bunker 20 and the axle 26. In addition to being secured at each of its ends to the axle 26 through the medium of flange element 34, vertical brackets 43 and the shackle components consisting of elements 50, 51, 52, and 54, the spring 53 is secured medially to the upper carriage bunker 20 by means of a flange 55 rigidly secured, as by welding, between the sides of the channel-shaped upper carriage bunker 20 and by a bolt unit 56 through the spring 53 and bracket element 55.

A longitudinal spring 57 is secured by U-bolts 58 and plate 59 medially of axle 26 in a position to align with and be directly under the tongue 10. Each end 60 of longitudinal leaf spring 57 is detachably secured to the tongue, or boom, 10 by means of U-bolts 66, bracket 65 retained by said U-bolts, bearing housing 63 which is rigidly secured to said bracket 65, bolt, or pin, 64, link elements 61, and bolt, or pin, 62. Springs 53 and 57 may have the arcs of their curvatures both up, both down, or one up and one down.

The tongue, or boom, 10 used in this variation, T, of my trailer is preferably equipped with a ground support element between the trailer hitch and the point of attachment of the winch upright on the under side of said tongue and, also, with a lifting handle positioned between the trailer hitch and the point of attachment of the winch upright on the upper side of said tongue.

Variations T' of my trailer, see FIGS. 7 and 9, consist of a carriage unit, composed and attached as described above, having additional longitudinal leaf spring 70 fastened medially thereof to flange element 34 by means of U-bolts at a point between, preferably, brackets 43 and spring and air boot sockets 35. In this variation the spring shackle plates 65 would be replaced with a shackle attachment bar 79 secured to said tongue, or boom, 69 by means of plate 80 and U-bolts. The shackle bar 79 would be wide enough to allow for parallel attachment of all longitudinal springs 70 and 57 by means of conventional shackle elements, such as described above, to points therealong. My trailer may be further modified by adding another identical carriage unit assembly in tandem with respect to the single carriage unit. In this variation a longitudinal leaf spring double shackle attachment bar 74 would be detachably secured to the tongue, or boom, 69 by means of plate 74' and U-bolts 75, installed similar to the attachment of the carriage bunker elements 20 to said tongue 69. Furthermore, in the variation consisting of the double carriage units the tie-rods 44 of each carriage unit would run oppositely to each other and would employ two bracket elements 48, one for each set of the rods. For the front carriage unit the tie-rods 44 would extend forwardly to the bracket element 48; and on the rear carriage unit they would extend rearwardly to the bracket element 48. In the double carriage variation the shackle bar 74, positioned between the carriage units, will be provided with brackets 72 near each end thereof. Each side of brackets 72 will carry a typical bearing housing fixedly secured thereto, to which the ends of the additional longitudinal springs 70 are secured by means of shackle elements 71, such as those described hereinabove for the installation of the central longitudinal spring 57. The shackle bars 79 will carry near each end thereof brackets 76 to each of which are rigidly secured typical bearing housings which, in turn, are attached to links 77 of the shackle units by means of bolts, etc., 78 passed therethrough. The lower ends of the link elements 77 will be attached to the ends of the longitudinal springs 70, as described hereinabove for other leaf springs employed in my trailer, by bolts, etc., 73.

It is understood that in the variations of my trailer one, two, or three longitudinal leaf springs may be employed, depending upon the load factors to be contended with in the particular usage to which the trailer may be put. If two springs are used, they will consist of the springs 70 with the spring 57 being eliminated; if three springs are used, both of the springs 70 and spring 57 will be employed. In any combination of longitudinal leaf springs each carriage unit will always be equipped with the transverse leaf spring 53 and may have springs 37, used with or without air boots 37', as the situation may indicate.

The trailer may be equipped with a utility box, camping trailer box, or other unit, 68, if so desired. In this usage variation the particular body employed will be detachably fastened, preferably in the manner hereinabove described, to its own tongue, or boom, 10 or 69, whichever may be the more suitable or desirable. It will also be provided with brackets 82 secured on its under surface which are designed to fit over the carriage bunker element 20 and have a bolt 83 passed through a hole in the lower end thereof aligning with each of the said holes 19 through the sides of the carriage bunker 20.

The forward end of the tongue 69 incorporates a tilting mechanism, such as that shown in FIG. 8. This mechanism may consist of a unit 84, having a conventional trailer hitch 87 at the forward end of said tongue which is fastenable to a conventional trailer hitch ball 88 secured to a point of attachment 89 on the towing vehicle. The rear end of the unit 84 is forked and so designed as to fit outside of the sides of the tongue 69. The rearmost end of unit 84 is pivotally attached to the tongue 69 by means of a bolt or pin 83, located at any suitable and practical point rearwardly of a conventional trailer hitch 82 at the front end of said tongue, or boom, 69. A conventional trailer hitch ball 85 is positioned and secured medially of said unit 84 by any conventional means, such as bolt and nut, 86 and aligned to mate with the trailer hitch element 82. It is apparent that detachment of the trailer hitch 82 from the trailer hitch ball 85 will allow the tongue 69 and the body unit or boat, particularly where a single carriage unit is employed, to tilt downwardly at its rear end, thereby facilitating loading or unloading of the trailer in certain situations.

In operation as a boat trailer my invention can be easily adjusted to the dimensions of several different sized boats without the necessity of carrying additional or unneeded weights in the form of telescoping tongues, or booms, etc. Through shifting of the tongue, or boom 10, relative to the carriage bunker 20 the desired balance longitudinally for the particular boat size may be obtained. Also, lateral adjustment may be obtained through different positioning of the uprights 15 which carry the pivotally mounted boat roller blocks 16. Furthermore, accurate alignment between the tongue and carriage unit may be obtained through slight changes in the relative lengths of the tie rods 44 by means of the threaded ends thereof. Hence, shortening and lengthening of said tie-rods 44 relative to each other will enable perfect alignment of the carriage unit with the tongue, or boom, 10. The transverse spring 53 in combination with a longitudinal spring 57 provide desirable stabilizing and load-bearing qualities in any attitude or stress that the trailer will be subjected to during usage, particularly so in maneuvering trailers around curves and corners of roadways at traveling speeds. The inter-action of these springs with each other provides good support and stabilization regardless of the direction the load weights may shift during a hauling operation, whether directly laterally or longitudinally or toward some intermediate point between them. In addition compensation for boat weights may be made through the air pressure changes in the air boots 37' positioned within the coil springs 37, and in some instances it may be desirable to eliminate any supporting effect of the air boots completely. As the load weights to which a trailer is subjected increase by reason of larger boats, heavier motors on said boats, etc., the pressures within the air boots 37' may be increased within certain limitations to compensate for the heavier loads. However, in other instances it will be desirable to provide additional longitudinal leaf springs 70 between the air boot and coil spring sockets 35 and vertical brackets 43. By the simple operation of removing U-bolts 66, shackle brackets 65, and substituting shackle bar 79 for shackle bracket 65 the additional longitudinal springs 70 may be readily added to the carriage unit to convert it thereby into one capable of handling much greater loads and stresses. In some instances it will be necessary to add only one additional longitudinal spring in which case spring 57 would merely be removed from the unit, leaving a spring 70 near each end of axle 26 to carry the load in conjunction with the transverse spring 53 and the air boots and coil springs 37' and 37, respectively.

If the load factors or boat sizes are substantially greater than the capacities of a single carriage unit and the tongue, or boom, 10 of an existing trailer, it is a simple operation to loosen U-bolts fastening the various elements to the tongue, or boom, withdraw said tongue, and insert in place thereof a longer one. Furthermore, in extremely heavy load factor situations an additional carriage unit may be added by installing the double shackle attachment bar 74 on the tongue between the two carriage units, thus providing an attachment point for the adjacent ends of the longitudinal springs of each carriage unit. In case of a double carriage usage additional tie-rods 44 and another tie-rod bracket 48 would be employed in such a manner that the tie-rods would run toward the rear from the rear carriage unit. This arrangement would enable, as described above, accurate alignment of each carriage unit with the tongue 10 or 69 and with respect to each other.

A utility trailer box, or camping trailer body, 68, having preferably its own tongue 10 or 69, can be substituted on any of the variations of the trailer carriage set-ups by removing the tongue rigged for usage in connection with boats and inserting in place thereof the tongue of the utility trailer, or camping trailer body unit, 68. In such body units 68 brackets 82 would be provided at appropriate points on the under surface thereof in such a position that they would engage with the carriage bunker 20 and be secured thereon by means of bolts 83 inserted through holes in the lower ends of the brackets 82 when they were aligned with any suitable hole of the plurality of holes 19 of the carriage bunker 20.

If a tilting tongue arrangement should be desirable in any of the usages or variations of the trailer, it could readily be installed by loosening the appropriate bolts, withdrawing the existing tongue 10, and inserting in place thereof the tilting tongue 59 which could then be aligned and secured in place by means of retightening the loosened U-bolts. It is obvious, furthermore, that, if a change of usage of the boat trailer unit were desired, a different body 68 could be placed upon the existing tongue and carriage arrangement by loosening and removing the elements necessary for boat hauling and substituting therefor those necessary to the attachment of the particular body unit 68. It is further apparent that the modifications in my trailer could readily be made without having to use a completely new trailer unit. The mere addition or removal of the appropriate elements to provide the necessary and desirable load factors for the particular usage would be all that would be required. Hence, by starting with the single carriage version of my trailer, as best seen in FIG. 1, the trailer could be modified to several different usages and load capacities without having to permanently discard any portion thereof or without having to completely discard the particular trailer unit. Also, the double carriage version may be made with one modified type of tie-rod bracket positioned on the tongue between the carriage units with all tie-rods running to this bracket.

It is apparent that variations from the versions of my trailer, or equivalents of portions thereof, are feasible without departing from the spirit of my invention. It is, therefore, to be understood that I am not limiting myself to the specific embodiments described which are merely preferred forms of the trailer.

Having thus described my invention, I claim:

1. In a trailer a trailer carriage consisting of: a carriage bunker; two uppper coil spring sockets detachably secured on the lower side of said carriage bunker, one near each of the bunker ends; an axle spacedly positioned below said carriage bunker; lower coil spring sockets fixedly secured near the outer ends of said axle, each one of said sockets being aligned with one of said upper coil spring sockets and provided with a coil spring locking means; a transverse spring positioned between said carriage bunker and said axle, said transverse spring being detachably secured medially thereof to said carriage bunker and detachably shackled at each of its ends to said axle; a longitudinal spring adjustably secured medially of said axle; longitudinal spring attachment means adjustably and detachably securing each end of said longitudinal spring to a trailer tongue; a coil spring retained in each aligning pair of said upper and lower coil spring sockets; an inflatable air boot positioned within each coil spring; and a wheel rotatably secured on each end of said axle.

2. In a boat trailer the combination of: a hollow tongue of quadrangular cross-section, having a conventional trailer hitch at one end thereof; a plurality of carriage bunkers in spaced relation to each other adjustably and detachably secured to said tongue; two upper coil spring sockets detachably secured on the lower side of each of said carriage bunkers, one upper coil spring socket near each end of each bunker; an axletree spacedly positioned below each of said carriage bunkers; a lower coil spring socket fixedly secured near each end of each of said axletrees, one of said sockets on each axletree being aligned with one of said upper coil spring sockets on the carriage bunker corresponding to said axletree; a tie-rod bracket secured on each of said axletrees near each lower spring socket; a transverse spring positioned between each of said carriage bunkers and its corresponding axletree, said transverse spring being detachably secured medially thereof to said carriage bunker and detachably shackled at each of its ends to said corresponding axletree; a longitudinal spring adjustably secured medially of each of said axletrees; means adjustably and detachably securing each end of each of said longitudinal springs to said tongue; a coil spring retained in each aligning pair of said upper and lower coil spring sockets; an inflatable and deflatable air boot positioned within each coil spring; a tie-rod bracket detachably and adjustably secured to said tongue; a tie-rod adjustably secured between each tie-rod bracket on each of said axletrees and one end of said tie-rod bracket on said tongue; and a wheel rotatably secured on each end of each of said axletrees.

3. In a boat trailer the combination of: a hollow tongue of quadrangular cross-section, having a conventional trailer hitch at one end thereof; a plurality of carriage bunkers in spaced relation to each other adjustably and detachably secured to said tongue; two upper coil spring sockets detachably secured on the lower side of each of said carriage bunkers, one upper coil spring socket near each end of each bunker; an axletree spacedly positioned below each of said carriage bunkers; a lower coil spring socket fixedly secured near each end of each of said axletrees, one of said sockets on each axletree being aligned with one of said upper coil spring sockets on the carriage bunker corresponding to said axletree; a tie-rod bracket secured on each of said axletrees near each lower spring socket; a transverse spring positioned between each of said carriage bunkers and its corresponding axletree, said transverse spring being detachably secured medially thereof to said carriage bunker and detachably shackled at each of its ends to said corresponding axletree; a longitudinal spring adjustably secured medially of each of said axletrees; means adjustably and detachably securing each end of each of said longitudinal springs to said tongue; a coil spring retained in each aligning pair of said upper and lower coil spring sockets; an inflatable and deflatable air boot positioned within each coil spring; a plurality of tie-rod brackets in spaced relation detachably and adjustably secured to said tongue; a tie-rod adjustably secured between each tie-rod bracket on each one of said axletrees and the same tie-rod bracket of said plurality of brackets on said tongue; and a wheel rotatably secured on each end of each of said axletrees.

4. In a trailer: a tongue provided with hitching means and tilting means; two trailer carriage units detachably and adjustably secured to said tongue, each carriage unit consisting of a carriage bunker, an upper coil spring socket secured on the lower side of said carriage bunker near each of its ends, an axletree spacedly positioned below said carriage bunker, a lower coil spring socket fixedly secured near each outer end of said axletree, each of said sockets aligning with a said upper coil spring socket on said carriage bunker, tie-rod fastening means secured on said axletree near each lower coil spring socket, a transverse spring detachably secured medially of said carriage bunker and detachably shackled at each of its ends to said axletree, a plurality of longitudinal springs in spaced relation to each other and each detachably secured medially thereof to said axle tree, a coil spring retained in each aligning pair of said upper and lower coil spring sockets, and an inflatable and deflatable air boot positioned within each coil spring; a plurality of longitudinal spring attachment cross-members secured to said tongue, one of the plurality of said attachment cross-members adjustably and detachably securing the corresponding ends of said longitudinal springs of at least one of said plurality of trailer carriage units; a tie-rod bracket adjustably secured to said tongue between said carriage units; a tie-rod adjustably secured between each of said tie-rod brackets on said axletree and said tie-rod bracket on said tongue; and a wheel rotatably secured on each end of each axletree of said carriage units.

5. In a trailer: a plurality of trailer carriage units, each consisting of a carriage bunker, an axle spacedly positioned below said carriage bunker, a transverse spring positioned between said carriage bunker and said axle and detachably secured medially thereof to said carriage bunker and at each of its ends to said axle, a plurality of longitudinal springs in spaced relation to each other, including a central longitudinal spring, and each detachably secured medially thereof to said axle; and a plurality of longitudinal spring attachment means, each of the plurality of said attachment means being slidably adjustable and detachably securable to a tongue and adjustably and detachably securing the corresponding ends of said longitudinal springs of at least one of said plurality of trailer carriage units.

6. In a trailer: a plurality of trailer carriage units, each consisting of a carriage bunker, an upper coil spring socket secured on the lower side of said carriage bunker near each of its ends, an axle spacedly positioned below said carriage bunker, a lower coil spring socket fixedly secured near each outer end of said axle, each of said sockets aligning with its corresponding upper coil spring socket on said carriage bunker, a transverse spring detachably secured medially of said carriage bunker and detachably shackled at each of its ends to said axletree, a plurality of longitudinal springs in spaced relation to each other and each detachably secured medially thereof to said axle, a coil spring retained in each aligning pair of said upper and lower coil spring sockets; a plurality of longitudinal spring attachment means, one of the plurality of said spring attachment means adjustably and detachably securing the corresponding ends of said longitudinal springs of at least one of said plurality of trailer carriage units to a trailer tongue; and a wheel rotatably secured on each end of each of said axles.

7. In a trailer carriage unit the combination of a carriage bunker, an axle spacedly positioned below said carriage bunker, a transverse spring secured medially thereof to said carriage bunker and positioned between said carriage bunker and said axle, said transverse spring being detachably secured at each end to said axle, a plurality of longitudinal springs detachably secured medially thereof to said axle in spaced relation to each other, means for adjustably and detachably securing each end of each of said longitudinal springs of said plurality of springs to a trailer tongue, an upper coil spring socket detachably secured to the under surface of said carriage bunker near each end thereof; a lower coil spring socket fixedly secured near each outer end of said axle and aligned with a said upper coil spring socket on said carriage bunker; a coil spring retained in each aligning pair of said coil spring sockets; and an inflatable and deflatable air boot positioned within each of said coil springs.

8. In a trailer carriage the combination of a carriage bunker, an axle spacedly posititoned below said carriage bunker, a transverse spring secured medially thereof to said carriage bunker and positioned between said carriage bunker and said axle, said transverse spring being detachably secured at each end to said axle, a plurality of longitudinal springs detachably secured medially thereof to said axle in spaced relation to each other, means for adjustably and detachably securing each end of each of said longitudinal springs of said plurality of springs to a trailer tongue, an upper coil spring socket detachably secured to the under surface of said carriage bunker near each end thereof; a lower coil spring socket fixedly secured near each other end of said axle and aligned with an upper coil spring socket on said carriage bunker; and a coil spring retained in each aligning pair of said coil spring sockets.

9. In a trailer containing a wheel-bearing axletree: a carriage bunker above and parallel to a wheel-bearing axletree; a tongue adjustably secured at right angles to said carriage bunker; a traverse leaf spring detachably secured between and in the plane of said carriage bunker and said axletree; a coil spring near each end of said transverse leaf spring between the said axletree and the said carriage bunker; an air boot within each coil spring; and a longitudinal leaf spring parallel with and adjustably secured to said tongue between said tongue and said axletree, said longitudinal leaf spring being detachably secured to said axletree.

10. In a trailer suspension system the combination of: a carriage bunker slidably adjustable and detachably secured on a tongue, said bunker being provided with a plurality of holes through its side surfaces and with a plurality of holes through its top surface medially thereof; an upper coil spring socket detachably secured at the lower edge of said bunker near each of its ends; an axle spacedly positioned below said carriage bunker; axle platforms fixably secured to said axle, one platform being near each of its ends; a lower coil spring socket fixably secured on each of said axle platforms; a coil spring lock fixably secured within the space above the lower edge of each of said lower sockets; a vertical bracket secured to the inner end of each of said axle platforms, said bracket having a hole therethrough and a shackle-bearing housing disposed thereon; a transverse leaf spring positioned between said carriage bunker and said axle, said transverse spring being detachably secured at its mid-point medially of said carriage bunker and shackled at each end to said shackle-bearing housings on said vertical brackets; a longitudinal leaf spring adjustably secured at its mid-point medially of said axle; a pair of longitudinal leaf spring shackle brackets adjustably and detachably secured to said tongue, one of said brackets positioned forwardly of said carriage bunker and the other of said brackets positioned rearwardly of said carriage bunker; shackles detachably fastening each of the ends of said longitudinal leaf spring to one of said shackle brackets; a coil spring secured in each of said lower coil spring sockets; an air boot positioned circumferentially within each coil spring, said air boot being provided with means for increasing or decreasing its pressure; and at the upper end of each of said coil springs a detachable coil spring locking means detachably securing the upper end of said coil spring within said upper coil spring socket and detachably securing said coil spring socket to said carriage bunker.

11. In a trailer carriage suspension system the combination of: a carriage bunker adjustably and detachably securable on a tongue; two upper coil spring sockets detachably secured on the lower side of said carriage bunker, one near each of the bunker ends; an axle spacedly positioned below said carriage bunker; lower coil spring sockets fixably secured near the outer ends of said axle, each one of said sockets being aligned with one of said upper coil spring sockets and provided with a coil spring locking means; a transverse spring positioned between said carriage bunker and said axle, said transverse spring being detachably secured to said carriage bunker and to said axle; a longitudinal spring adjustably secured to said axle and slidably adjustable and detachably securable on said tongue; and a coil spring retained in each aligning pair of said upper and lower coil spring sockets.

12. In a trailer containing a wheel-bearing axletree: a carriage bunker above and parallel to a wheel-bearing axletree; a tongue adjustably secured at right angles to said carriage bunker; a transverse leaf spring detachably secured between and in the plane of said carriage bunker and said axletree; a coil spring near each end of said transverse leaf spring between the said axletree and said carriage bunker; and a longitudinal leaf spring parallel with and adjustably secured to said tongue between said tongue and said axletree, said longitudinal leaf spring being detachably secured to said axletree.

References Cited in the file of this patent

UNITED STATES PATENTS

| | | |
|---|---|---|
| 1,102,858 | Bethune et al. | July 7, 1914 |
| 1,268,077 | Klein | May 28, 1918 |
| 1,324,552 | Jenkins | Dec. 9, 1919 |
| 1,913,939 | Miller et al. | June 13, 1933 |
| 2,002,459 | Viviano | May 21, 1935 |
| 2,374,383 | Sampsell | Apr. 24, 1945 |
| 2,691,534 | Sampsell | Oct. 12, 1954 |
| 2,744,764 | Weaver | May 8, 1956 |
| 2,776,053 | Madruga | Oct. 9, 1956 |
| 2,776,761 | Lovelace | Jan. 8, 1957 |
| 2,823,817 | Holsclaw | Feb. 18, 1958 |
| 2,824,752 | Schwartz | Feb. 25, 1958 |

FOREIGN PATENTS

| | | |
|---|---|---|
| 519,992 | Italy | Mar. 17, 1955 |